Dec. 21, 1948.　　G. A. CHADWICK ET AL　　2,456,620
AMMUNITION STOWAGE AND HANDLING

Filed July 30, 1941　　15 Sheets-Sheet 1

Fig.1.

INVENTORS
George A. Chadwick
BY Philias H. Girouard
ATTORNEY

Dec. 21, 1948.  G. A. CHADWICK ET AL  2,456,620
AMMUNITION STOWAGE AND HANDLING
Filed July 30, 1941  15 Sheets-Sheet 4

Fig. 4.

INVENTORS
George A. Chadwick
Philias H. Girouard
BY
ATTORNEY

Dec. 21, 1948.  G. A. CHADWICK ET AL  2,456,620
AMMUNITION STOWAGE AND HANDLING

Filed July 30, 1941  15 Sheets-Sheet 5

Fig.5.

INVENTORS
George A. Chadwick
Philias H. Girouard
BY
ATTORNEY

Dec. 21, 1948.   G. A. CHADWICK ET AL   2,456,620
AMMUNITION STOWAGE AND HANDLING
Filed July 30, 1941   15 Sheets-Sheet 6

Fig.6.

INVENTORS
George A. Chadwick
Philias H. Girouard
BY
ATTORNEY

Dec. 21, 1948.  G. A. CHADWICK ET AL  2,456,620
AMMUNITION STOWAGE AND HANDLING
Filed July 30, 1941  15 Sheets-Sheet 7

Fig. 7.

INVENTORS
George A. Chadwick
Philias H. Girouard
BY
ATTORNEY

Dec. 21, 1948.  G. A. CHADWICK ET AL  2,456,620
AMMUNITION STOWAGE AND HANDLING
Filed July 30, 1941  15 Sheets-Sheet 10

INVENTORS
George A. Chadwick
Philias H. Girouard
BY
ATTORNEY

Dec. 21, 1948.  G. A. CHADWICK ET AL  2,456,620
AMMUNITION STOWAGE AND HANDLING
Filed July 30, 1941  15 Sheets-Sheet 11

INVENTORS
George A. Chadwick
BY Philias H Girouard
ATTORNEY

Dec. 21, 1948.  G. A. CHADWICK ET AL  2,456,620
AMMUNITION STOWAGE AND HANDLING
Filed July 30, 1941  15 Sheets-Sheet 13

INVENTORS
George A. Chadwick
Philias H. Girouard
BY
K. C. Caldwell
ATTORNEY Dec. 21, 1948.  G. A. CHADWICK ET AL  2,456,620
AMMUNITION STOWAGE AND HANDLING Filed July 30, 1941  15 Sheets-Sheet 14

INVENTORS
George A. Chadwick
BY Philias H. Girouard
ATTORNEY

UNITED STATES PATENT OFFICE 2,456,620

AMMUNITION STOWAGE AND HANDLING

George A. Chadwick, Washington Grove, Md., and
Philias H. Girouard, Washington, D. C.

Application July 30, 1941, Serial No. 404,676

12 Claims. (Cl. 89—1)

(Granted under the act of March 3, 1883, as
amended April 30, 1928; 370 O. G. 757)

This invention relates to war vessel construction in connection with gun turrets and more particularly to means and mechanisms for stowing projectiles and other ammunition and moving the same to hoists whereby the projectiles, etc., are lifted into position adjacent the guns.

Among the numerous objects of this invention are:

To provide for the stowage of a greater number of projectiles than in the structures at present used;

To provide means for loading projectiles directly into a hoist from more than one direction;

To exercise positive control of heavy projectiles while they are being moved between stowage spaces and hoists or vice versa;

To provide for moving projectiles to the guns regardless of rolling or list of the ship, whereby the rate of fire may be maintained under adverse conditions;

To provide stowage means movable to dispose projectiles therein for direct loading into a hoist;

To provide fixed stowage means from which projectiles can be moved directly to a hoist or to the movable stowage means above mentioned;

To provide stowage means at more than one level and hoists into which such projectiles can be loaded at each level; and To provide stowage means such that projectiles may be moved freely in stowage or to the hoists without interference by ship structure.

It has been difficult to maintain the rate of fire of heavy guns aboard ships when the water is rough or when the ship is listing due to damage. Likewise, the space provided for stowage of heavy projectiles in older systems is inadequate for present day long range operation and the possibility of prolonged naval actions or bombardments of land objectives by naval guns. The present invention insures adequate stocks of projectiles and furthermore makes it possible to serve such projectiles to the guns regardless of roughness of the water or list of the ship and makes possible the moving of projectiles in stowage without interference from parts of the ship or turret structure.

Figure 1:
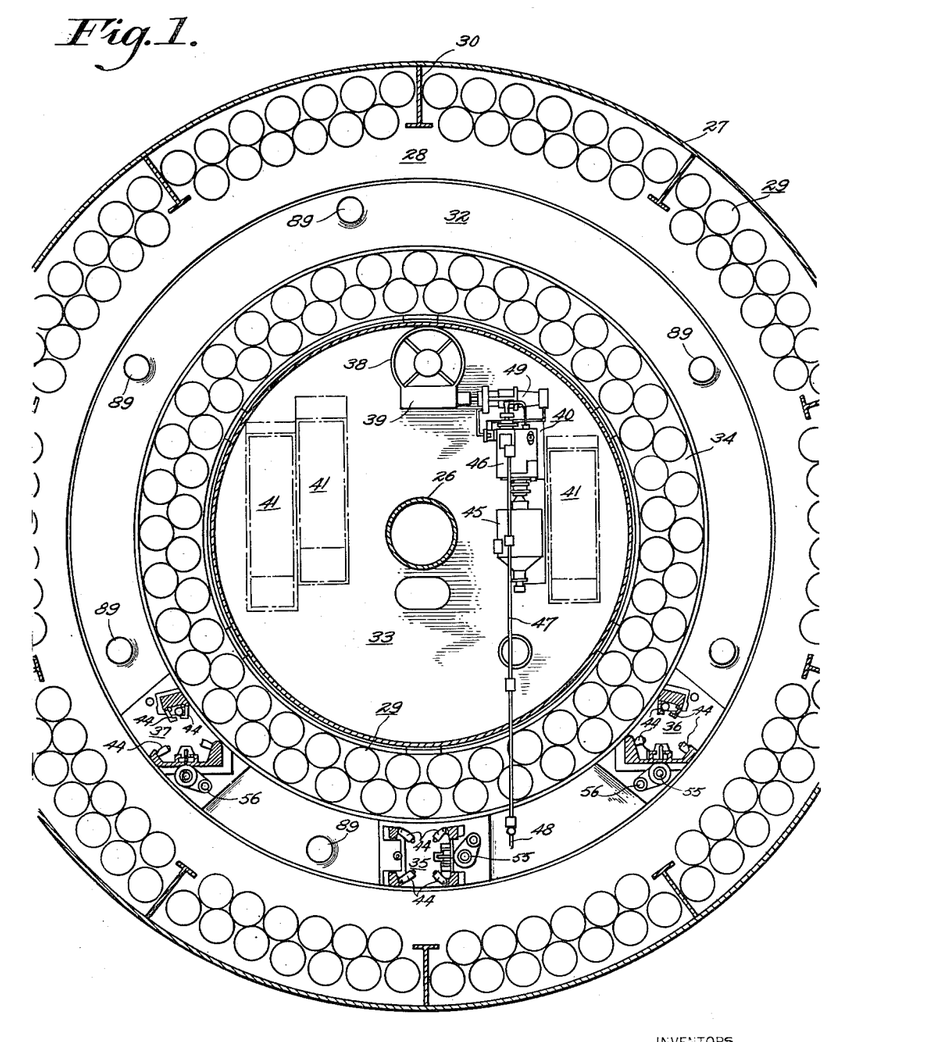
Fig. 1 is a horizontal sectional view showing the plan of the lower of two stowage levels.

Referring now to Fig. 1 of the drawings, the reference character 26 designates the center column of a turret having a triple mount for large caliber guns. While the present invention is not restricted to any particular size of projectile nor to projectiles rather than both projectiles and powder, it will be understood that smaller caliber projectiles present no serious problem in handling by the methods and means heretofore known and consequently the present description will be limited in terms to large caliber installations.

The stool 27 of the turret supports the turret roller track and, as shown in Fig. 1, it defines the outer boundary of a fixed stowage rack 28 at the lower of two stowage levels in which are two annular series of projectiles 29. The structural members 30 support an upper fixed stowage rack 31 shown in Fig. 2.

The annular member 32 and the circular portion 33 are connected to the turret and mounted for rotation therewith. Between the annular portion 32 and the circular portion 33 is a movable stowage ring 34 that can rotate with the parts 32 and 33 but can also be driven by mechanism hereinafter described to rotate independently of, and relatively to, the turret structure. Figure 1 indicates the positions of the center hoist 35 and the wing hoists 36 and 37 in the annular portion 32. The stowage ring 34 is driven by a gear 38 through a reduction mechanism 39 from an electro-hydraulic mechanism designated in its entirety by 40. The rectangles 41 in Fig. 1 indicate the positions of the powder hoist trunks.

Figure 2:
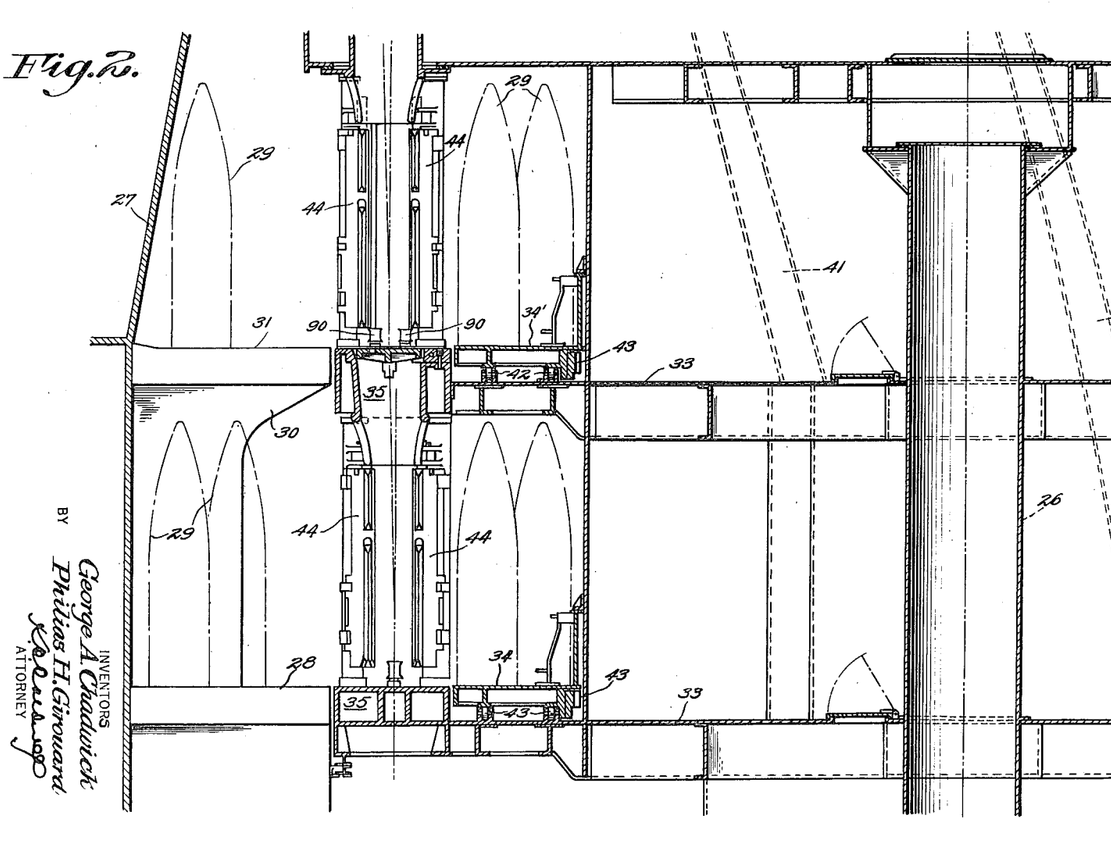
Fig. 2 is a vertical section through one side of both stowage levels and the turret center column.

Fig. 2 shows the structural relations among the several parts of the stowage and handling means. As will be observed in this figure, there is projectile stowage on each of two superposed levels. The movable stowage ring 34 on the lower level has a counterpart 34' on the upper level and each of these rings is adapted to carry two annular series of projectiles 29. The rings 34 and 34' are rotatably mounted on a series of rollers 42 supported by the turret structure and are driven by ring gears 43 meshed with a respective driving gear 38 at each level. The lower fixed stowage rack 28 is adapted to carry two annular series of projectiles while the upper fixed stowage rack 31 carries but one annular series of projectiles due to the inward inclination of the stool 27.

While the center hoist 35 is shown in Fig. 2, the general relations are the same in all the hoists. At each level, flaps or shutters 44 are provided to give access to the hoist from each of two different directions to permit loading projectiles directly into the hoist from either a movable stowage ring 34 or 34' or from a fixed stowage rack 28 or 31, as the case may be. This obviates the necessity of moving the projectiles from the fixed stowage to the movable stowage, or vice versa, before loading into the hoist. It is apparent that as projectiles are fed into a hoist from movable stowage ring 34 or 34' the ring may be rotated so that the projectiles carried thereby are presented for direct loading into a hoist. Thus it is immaterial whether the ship rolls or pitches or is listing, the projectiles can be supplied to the guns so long as sufficient power remains to operate the hoists and the rate of fire will be maintained, which may be a decisive factor in a naval engagement.

As the projectiles are used from movable stowage rings 34 and 34', projectiles from the fixed stowage 28 or 31 may be moved across the portion 32 to the movable stowage to be brought into loading position with respect to the hoists. However, it is not necessary that projectiles be transferred from the fixed stowage racks 28 and 31 to the stowage rings 34 and 34' due to the fact that means are provided, as hereinafter described, to transfer projectiles from the fixed stowage to the hoists. It is readily apparent, from Fig. 1, that there will be little, if any, interference with free movement of projectiles in stowage due to ship or turret structural elements.

Figure 3:
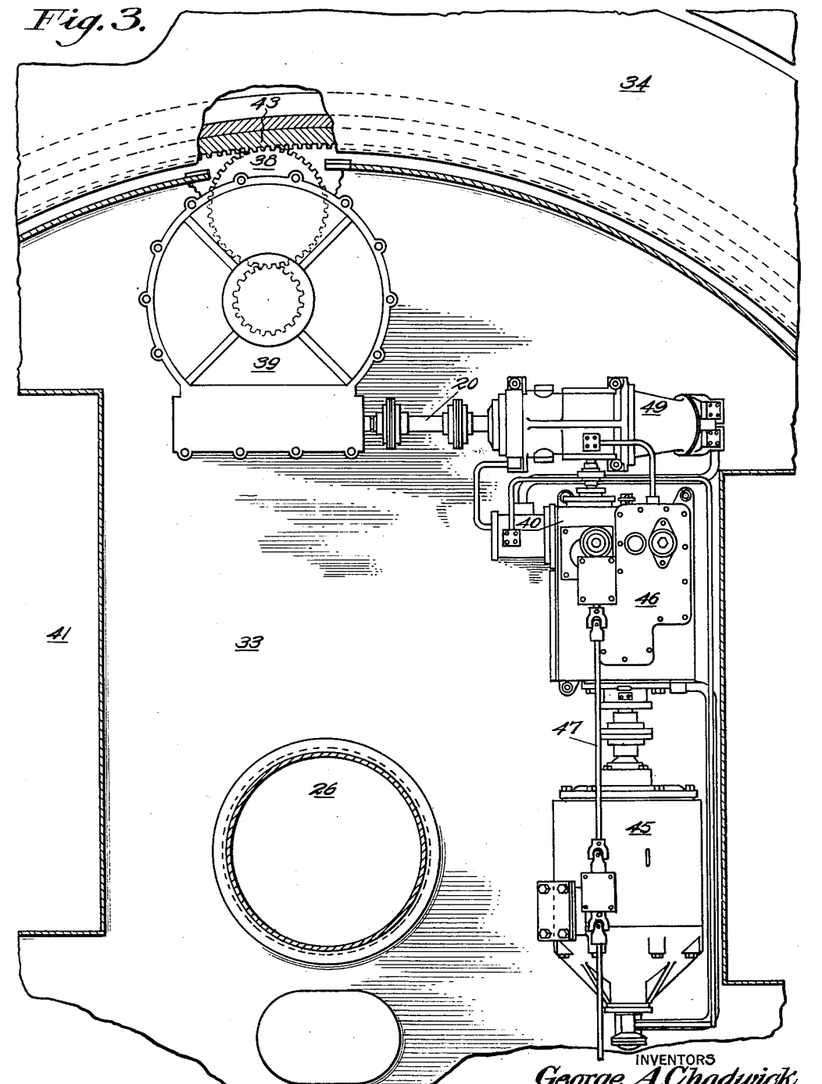
Fig. 3 is a plan view of mechanism for driving the movable stowage ring.
Figure 4:
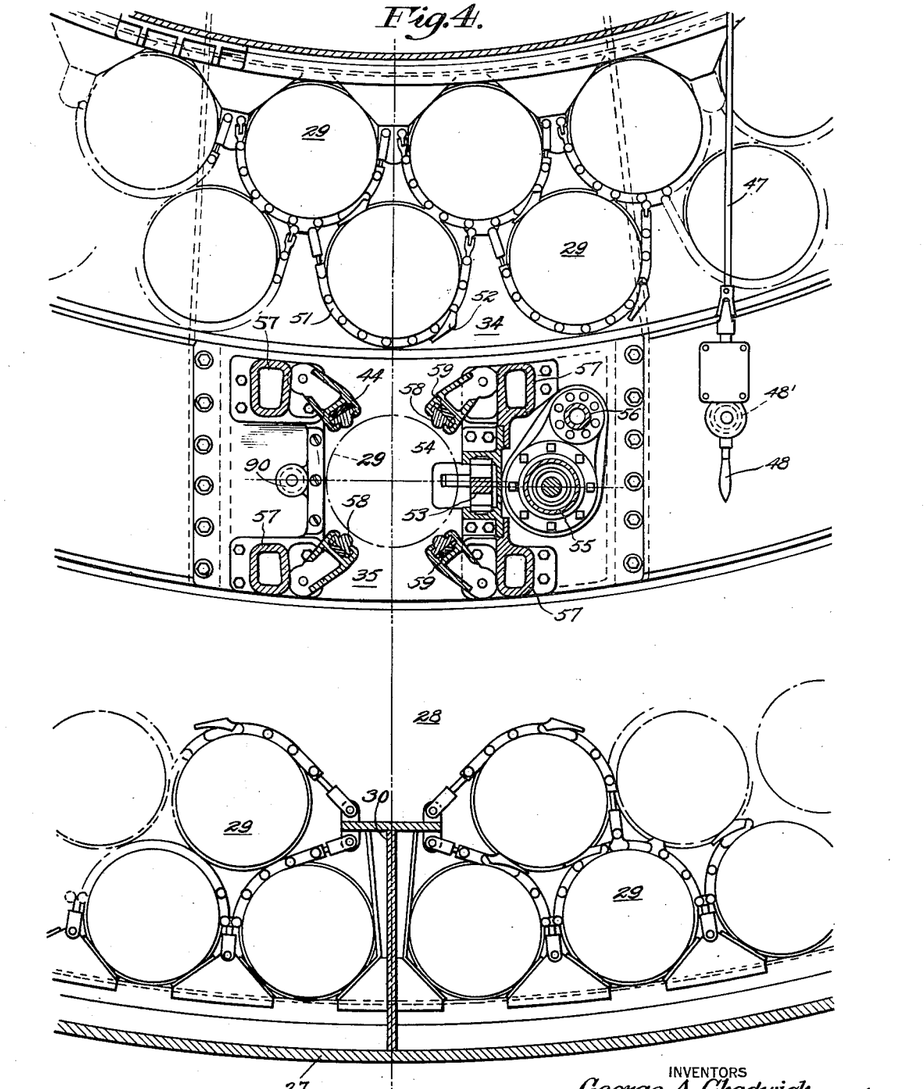
Fig. 4 is a fragmentary view of the lower level stowage and the center hoist in a turret having a movable gun mount.

Fig. 3 is an enlarged detail view of the mechanism for operating the movable stowage rings 34 and 34'. It is to be understood that like mechanism is provided at each of the two stowage levels. The electric motor 45 is connected to drive the A end 46 of a hydraulic variable speed gear whereof the stroke is controlled by a shaft 47 operable by means of a control lever 48 adjacent a hoist, as is shown in Fig. 4. The lever 48 is attached to a gear 48' that is rotatable by means of lever 48 and is meshed with a pinion (not shown) on shaft 47. The A end 46 drives a B end 49 that is coupled by means of shaft 50 to drive the speed reduction mechanism 39.

Fig. 4 is a fragmentary enlarged detail of a portion of the rotatable stowage ring 34 and the center hoist 35, showing means of securement of the projectiles on the stowage ring. It will be noted that each projectile 29 is individually secured by a quick detachable chain 51 having the two portions thereof secured together and the chain tightened by a toggle fastener 52 of conventional type though other kinds of individual lashings may be used. Thus, the projectiles may be released one at a time from the lashings that hold them fixed in stowage immediately before they are to be loaded into the hoist. The hoist 35 is structurally like the wing hoists but the relative arrangement of the parts is somewhat different owing to the change in relative position with respect to the projectile stowage means.

The hoist is shown as being of the ratchet type having a ratchet bar 53 reciprocating in guides 54 and driven by a piston in cylinder 55, the pipe 56 serving as a part of the oil conducting system. Since the specific type of hoist forms no part of the present invention, it will not be shown in detail nor further described. However, the supporting structure of the hoist is believed to be novel in that it comprises vertical post members 57 which are four in number in the center hoist 35 and three in number in the wing hoists 36 and 37.

The shutters 44 are mounted to be movable inwardly by a projectile being fed into the hoist but are prevented by stops from rotating outwardly beyond a predetermined position so that they guide the projectile and prevent its falling out of the hoists due to rolling, pitching or listing of the vessel. In each of certain shutters 44 the free edge has a buffer strip 58 mounted therein with a yieldable buffer pad 59 behind it to cushion the impact if the projectile is thrown against the strip 58. It is to be understood that the hoists may be used for elevating projectiles to the guns in the turrets or they may be used to lower projectiles into the stowage means. When used to lower projectiles it is necessary that the shutters 44 be locked in an inwardly-swung position to permit removal of the projectile from the hoist and the locking means serving this purpose will be hereinafter described.

Figs. 8 to 19 depict certain structural details of the posts 57 and the shutters 44. It will be seen in Figs. 8, 9 and 10, which show center hoist 35 construction, that each shutter is supported at one edge by engagement of ears 60 with ears 61 carried by the posts 57, all these ears being coaxially apertured, and a hinge pin 62 is passed through such apertures. Springs 63 are connected at one end to the post 57 and at the other end to the shutters 44 and placed under tension so that they bias the shutters to move to their outwardly-swung positions against the stops 64.

Adjacent the upper end of each shutter is mounted a latch pin 65 having attached to it a manipulating handle 66. When the handle 66 rides upon the top of the guide 67 the pin 65 is held retracted and inoperative but when the handle 66 is moved down into slot 68 the pin 65 drops down and engages a recess 69 in the upper end of the shutter 44 to hold the shutter in its inwardly-swung position to permit the removal of projectiles from the hoist when the same are being lowered to stowage. A second locking aperture is provided in each shutter to be engaged by locking pin 65 to retain the shutters at one side of the hoist in the outwardly-swung position and prevent their being swung inwardly by contact with a projectile that is rotating while being parbuckled into the other side of the hoist. Such aperture is directly below pin 65 in Fig. 19.

The mounting of two shutters 44 on a single post 57 in the wing hoists 36 and 37 is illustrated in Figs. 11 to 13 and 16. It is apparent that the shutters 44 may be moved inwardly to permit loading the projectile 29 into the hoist from either one of two directions but will prevent outward displacement of the projectile from the hoist due to rocking or other like motions of the ship.

If the hoist should be operated while one or more of the shutters 44 is in its inward position, a projectile in the hoist might fall out. Such contingency is prevented by the interlock system shown schematically in Fig. 26. The hoist may be operated on the lower level by hoist control level 95 or from the upper level by lever 95'.

Figure 26:
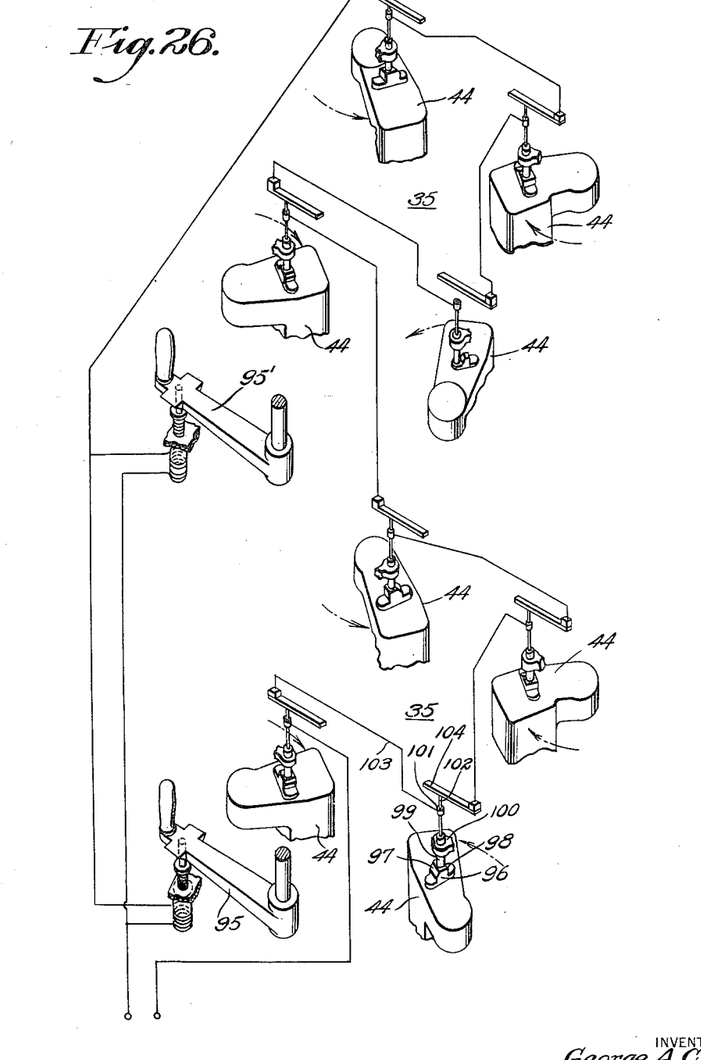
Fig. 26 is a schematic lay-out of the interlock between the shutters and the hoist controls.

Each shutter 44 carries a cam block 96 having a sloping face 97 and an upper face 98 disposed to contact a switch plunger 99 slidable in a guide 100. Fixed on the plunger 99 is an insulating member 101 which carries a contact element 102 that is electrically connected to a wire 103. Element 102 makes conductive contact with a yieldable member 104 when plunger 99 rests upon face 98, but breaks that contact when the shutter is swung inwardly and the plunger rides down face 97 due to the action of a compressed spring (not shown).

All of contacts 102—104 are in series with each other and with solenoids 105. When all the shutters 44 on both levels are closed current flows through all the contacts and the solenoids, drawing down the locking pins 106 that engage levers 95 and 95' to prevent operating the hoist when a shutter is open and the solenoids are not energized. A spring 107 moves the pin 106 up when the circuit is broken. Cam blocks 108 are fixed to levers 95 and 95' to permit moving these levers to neutral when the circuit is broken and pins 106 are pushed up while the lever is in another position. This system prevents any operation of the hoist unless all shutters are in their outward position.

Figure 5:
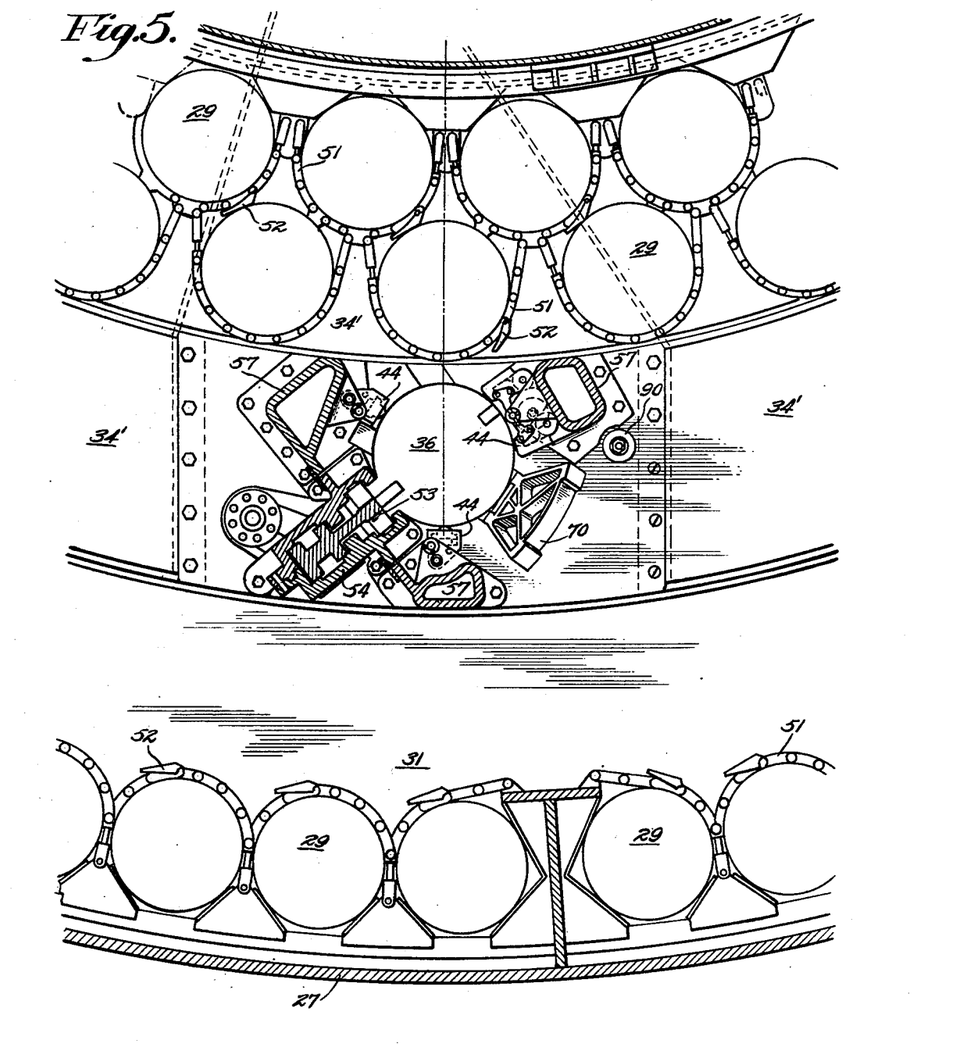
Fig. 5 is a fragmentary view of the upper level and a wing hoist, showing the loading gate in the hoist in open position.
Figure 20:
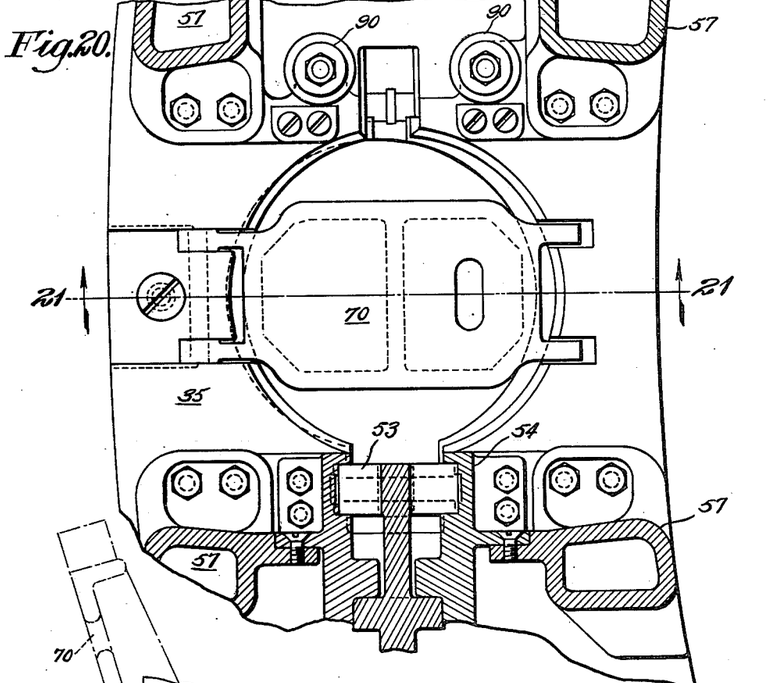
Fig. 20 is an enlarged detail of a section through the hoist, showing the loading gate in position for hoisting projectiles from the upper level.
Figure 21:
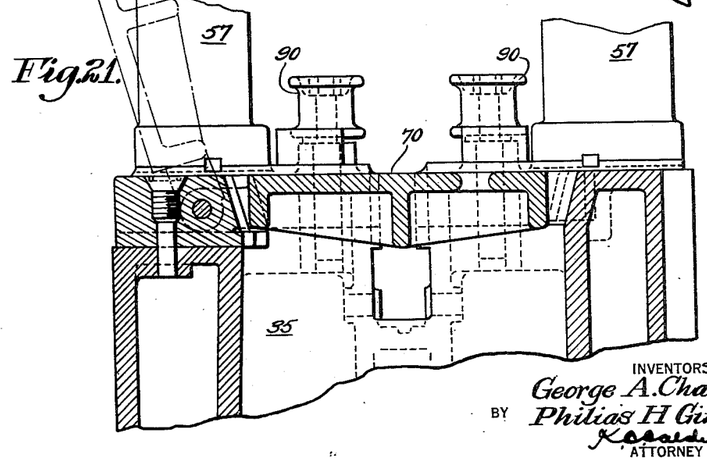
Fig. 21 is a vertical section through Fig. 20 on the line 21—21, with the gate shown in open position in dotted lines.

It is evident that if a single passageway for projectiles being moved in a hoist is to be used for handling projectiles from two different levels, some means must be provided to receive projectiles at the upper level and prevent them from dropping down to the lower level. For this purpose we have provided at the upper level a loading gate 70 that may be moved to position across the projectile passageway as shown in Fig. 20 or may be swung back out of the projectile passageway to permit movement of projectiles to or from the lower level, as indicated in dotted lines in Fig. 21. Figs. 20 and 21 illustrate the loading gate used in the center hoist, while Fig. 5 shows how the loading gate is mounted in the wing hoists.

Mention has been made of means for moving the projectiles and the mechanism for that purpose will now be described. One such mechanism for transferring projectiles from the movable stowage rings 34 and 34' is shown in Figs. 22 to 25. While specific structure has been delineated to explain our invention, it is to be understood that this is by way of illustration only and is not to be construed as placing any limitations on the scope of our invention.

Figure 22:
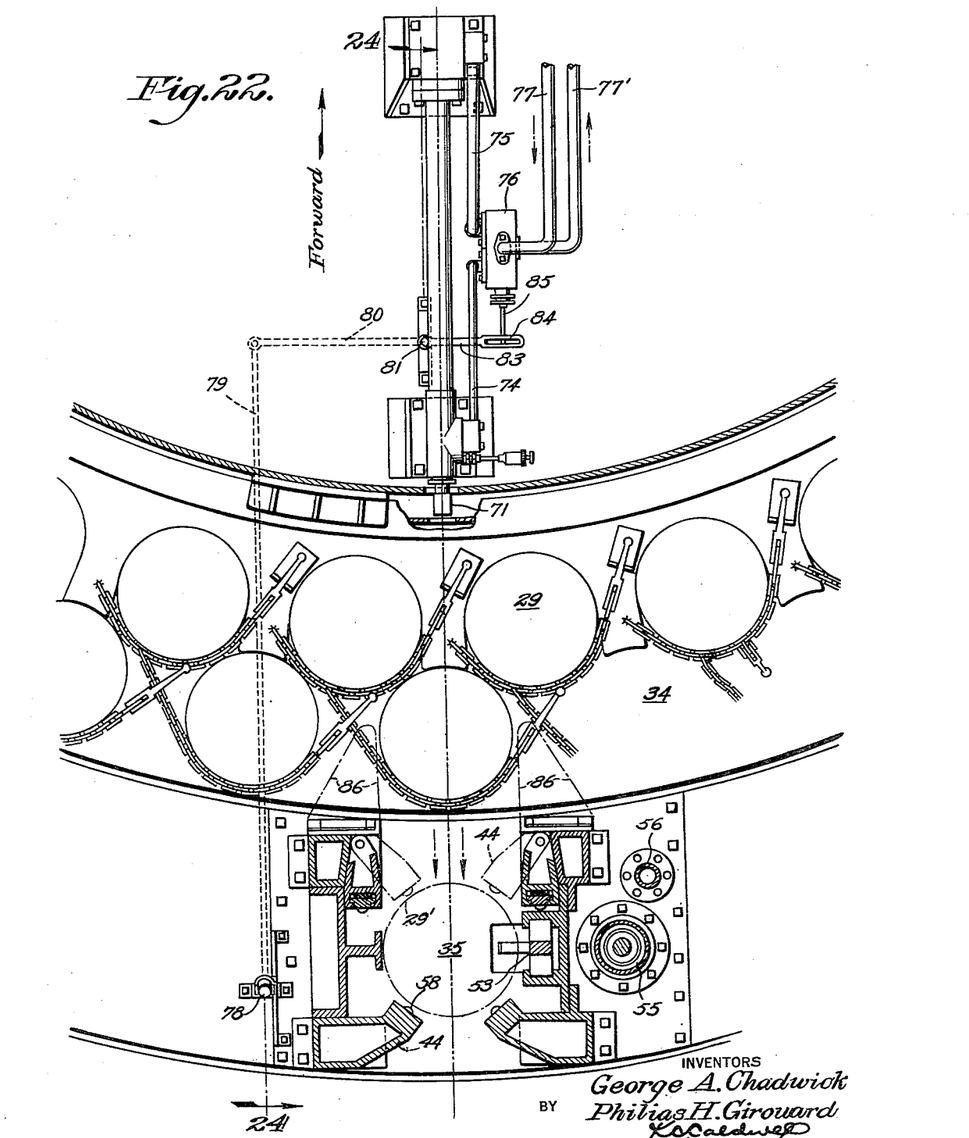
Fig. 22 is a top plan view of rammer mechanism for loading projectiles into a hoist.
Figures 23, 24:
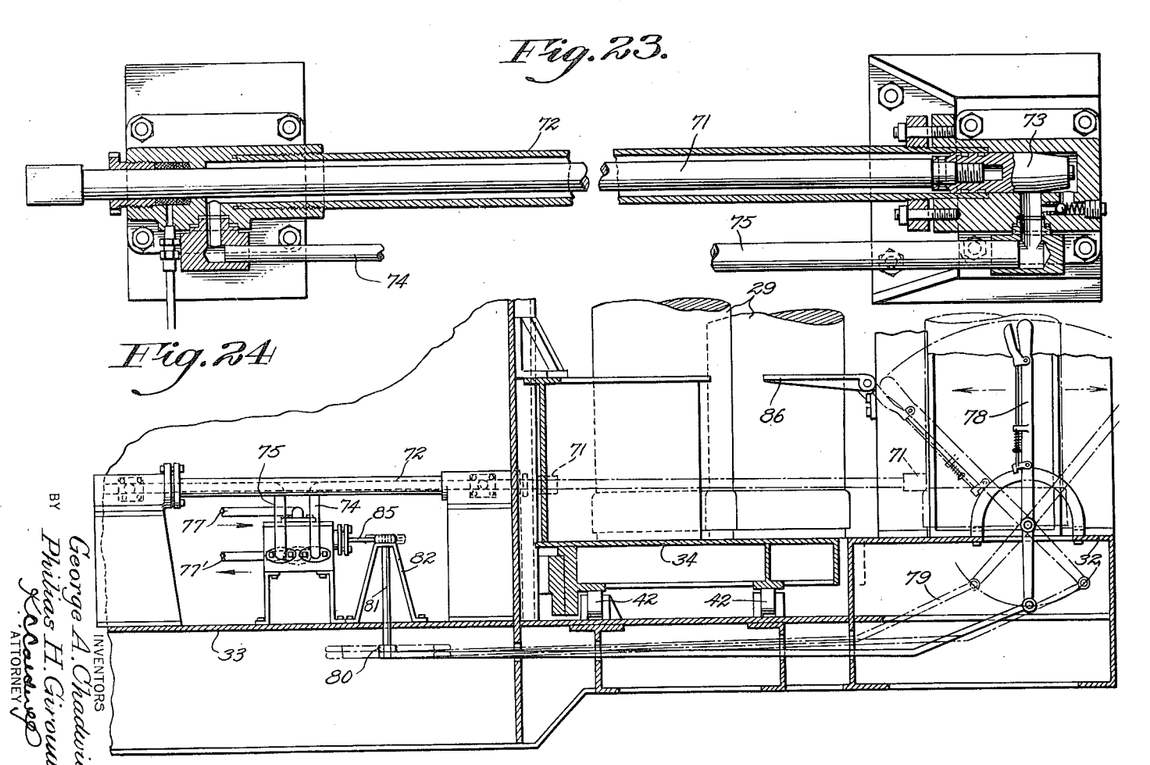
Fig. 23 is a detail of the rammer mechanism, with parts in section.
Fig. 24 is a side elevation of the rammer and control therefor adjacent the hoist on line 24—24, Fig. 22.
Figure 25:
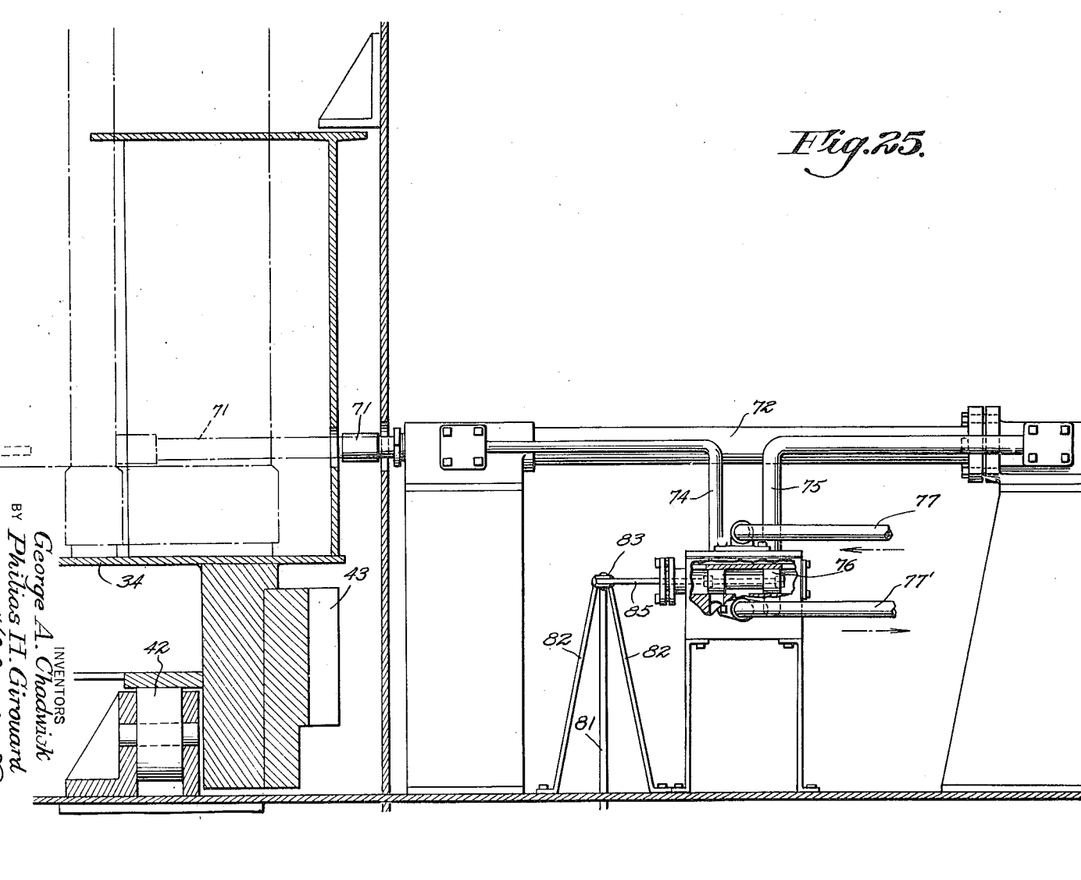
Fig. 25 is a side elevation of the rammer mechanism with the control valve thereof in section.

The mechanism for loading projectiles into the center hoist is shown in Fig. 22 but the same type may be used with each of the other hoists. A ram 71 is mounted to be slidable in a cylinder 72 and carries at one end a piston 73 that is acted upon by fluid under pressure supplied to cylinder 72 through pipes 74 and 75. The direction of movement of the ram 71 is controlled by a valve 76 that is movable to connect either end of cylinder 72 to pipe 77 connected to the pressure side of a pump and simultaneously connect the other end of cylinder 72 to pipe 77' to a reservoir from which the pump is supplied, or the valve 76 may be set so that no fluid is admitted to cylinder 72. Control of the movement of ram 71 may be effected by operation of a well known type of lever 78 mounted near a hoist and connected through a link 79 to a lever 80 that is engaged with the lower end of a shaft 81 that is rotatably supported in a frame 82, the upper end of shaft 81 being connected to a second lever 83 having a pin and slot connection 84 with stem 85 secured to valve 76. It is apparent that when lever 78 is in the neutral full line position of Fig. 24 the access of fluid under pressure to cylinder 72 will be prevented whereas movement of the lever 78 to one or the other of its dotted line positions will result in the power operation of ram 71. Since ram 71 is disposed with its axis along a radius that passes through the hoist, a projectile disposed in front of ram 71 and freed from its lashings will be moved into the hoist by the ram. As is shown in Figs. 22 and 24, hinged guides 86 are provided at the hoist to guide the projectiles into the hoist. The guides 86 are so shaped that when a projectile 29 is brought into contact with the outer edge of a guide through rotation of the stowage ring 34, the guide will be swung upwardly on its pivot to permit the projectile to pass into position where it will be transferred to the hoist by operation of ram 71.

Figure 6:
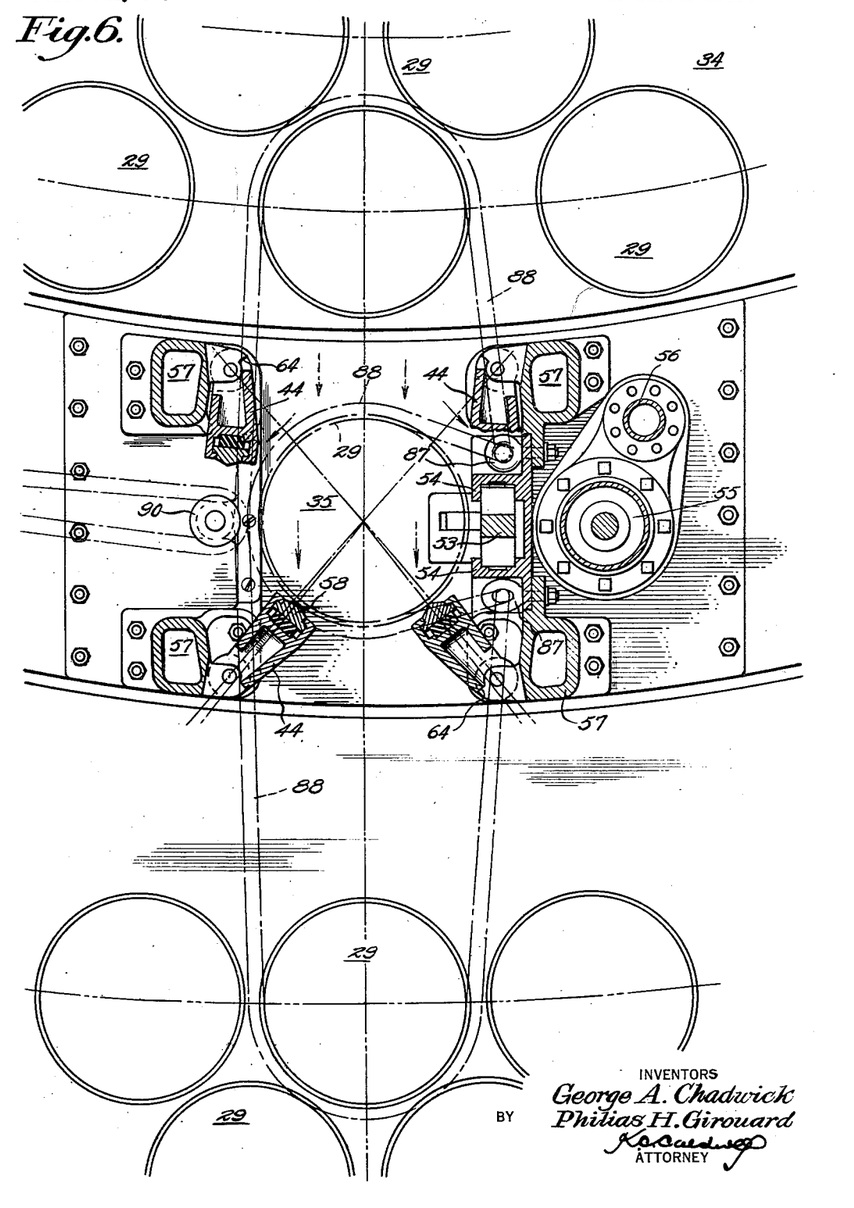
Fig. 6 is an enlarged fragmentary sectional view of the center hoist, with parbuckling means for handling projectiles.
Figure 7:
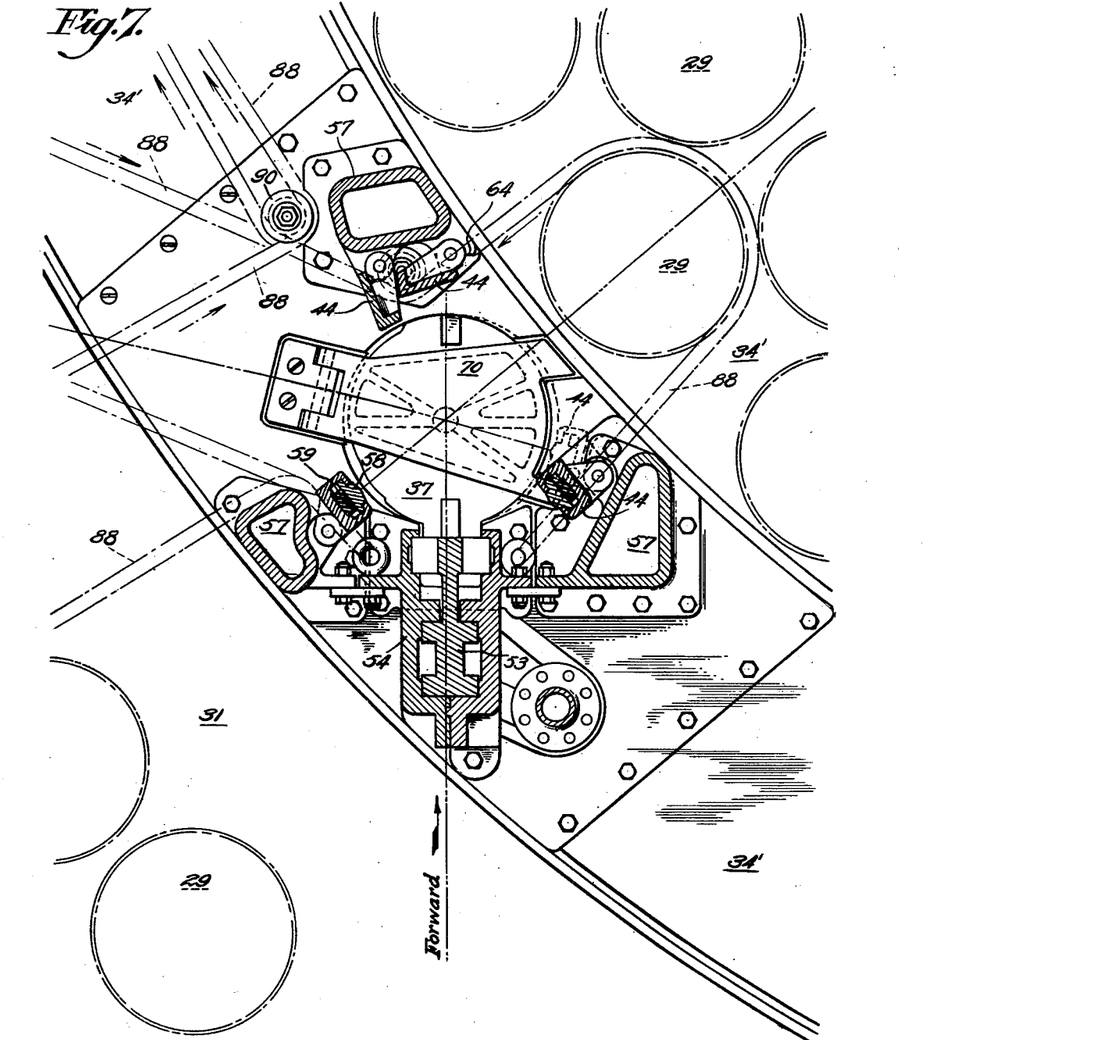
Fig. 7 is similar to Fig. 6 but shows a wing hoist.
Figure 8:
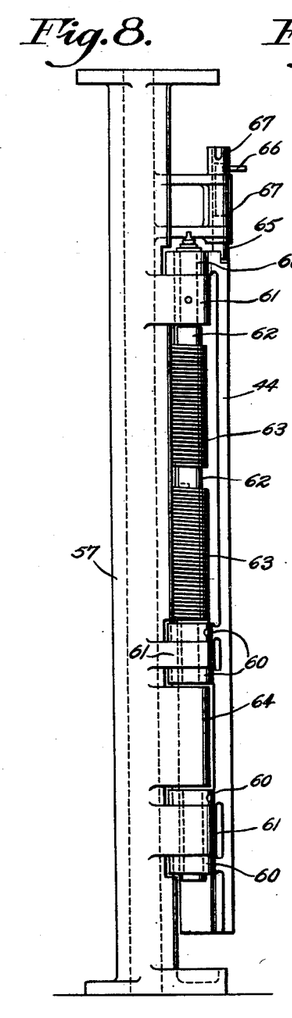
Figs. 8 to 19, both inclusive, are various details of the shutters or flaps whereby access to the hoist is had and projectiles are guided during hoisting.
Figures 9, 10:
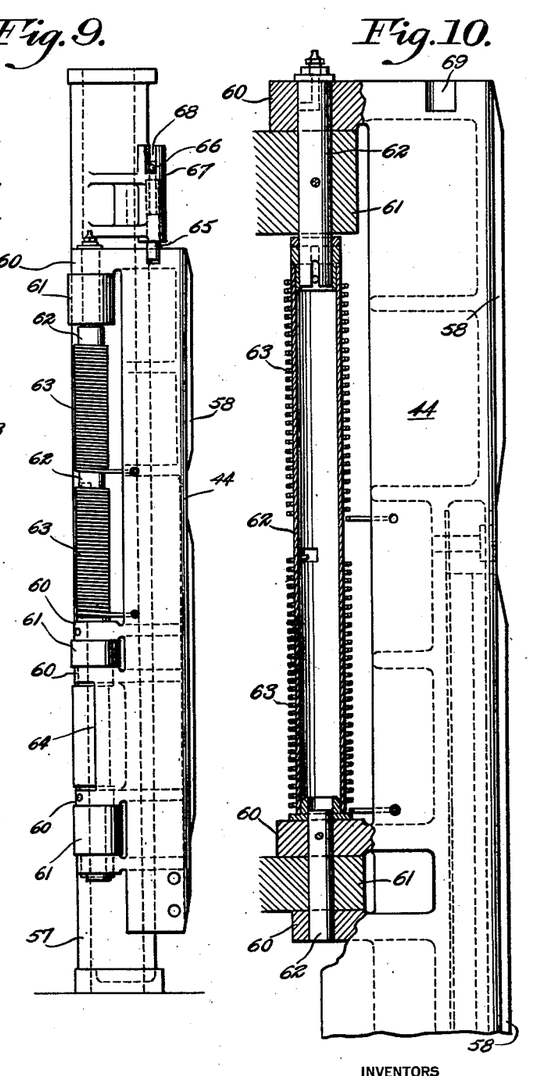
Figures 11, 12:
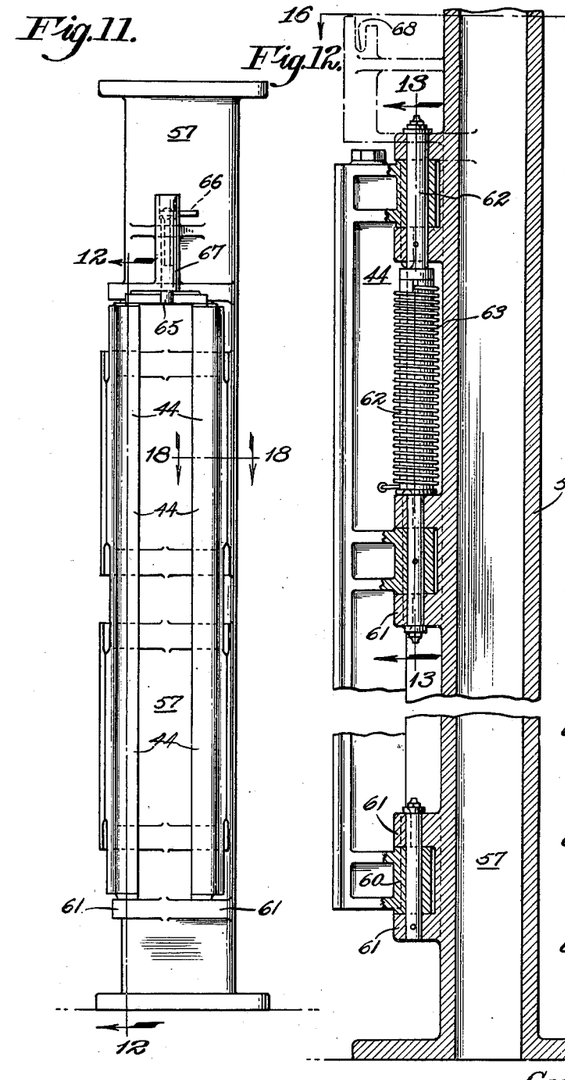
Figure 13:
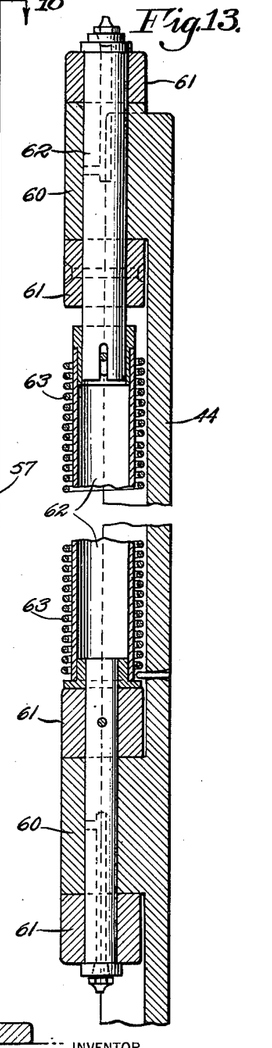
Figure 14:
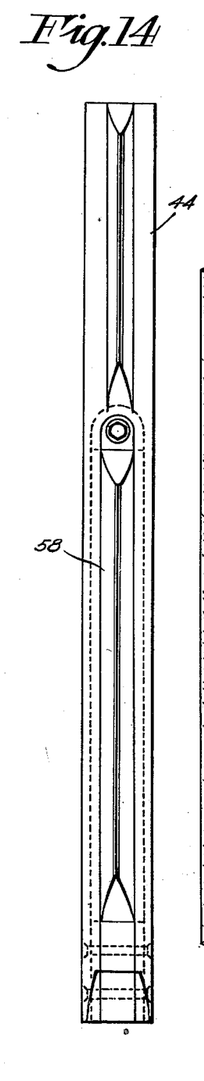
Figures 15, 16, 17, 18, 19:
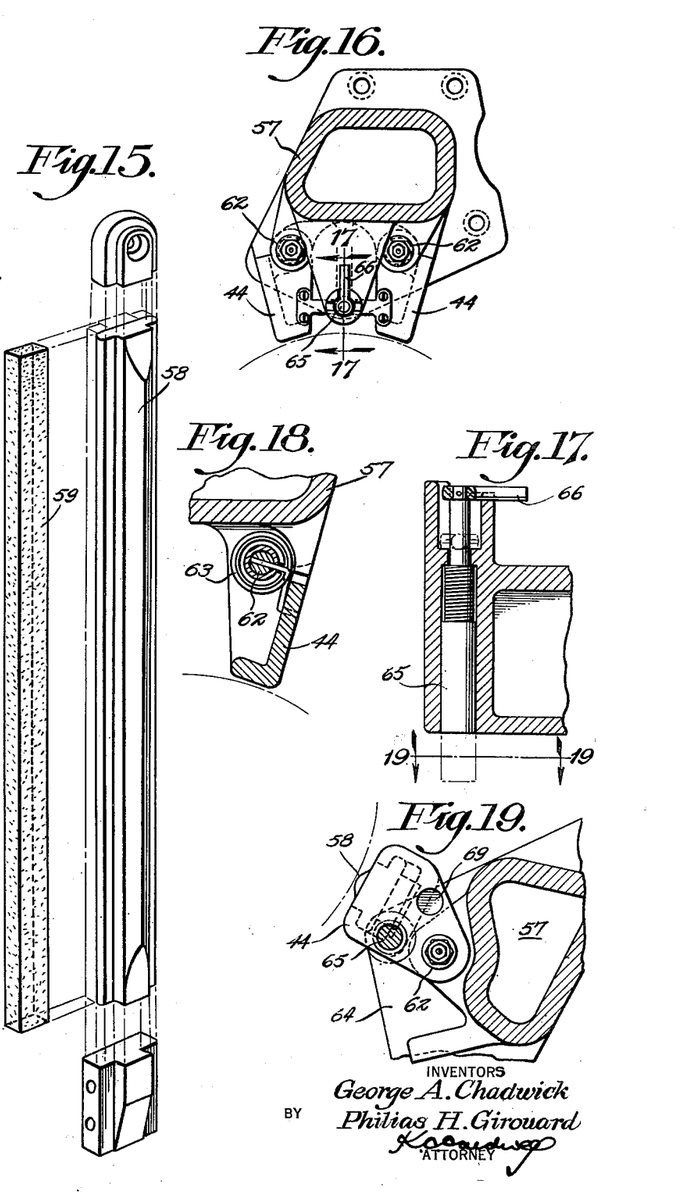

It is obvious that it is not feasible to move projectiles from the fixed stowage racks 28 and 31 by means of rams such as 71. Likewise, it is desirable that means should be provided for moving projectiles from the fixed stowage racks to replace the projectiles removed from the stowage rings 34 and 34', where they are more readily available to the guns. For this purpose we have provided power operated parbuckling means. Adjacent each hoist are fixed a number of securement elements such as the heavy eyes 87 to which one end of a flexible parbuckling element 88 may be attached as shown in Figs. 6 and 7. A plurality of power operated sheaves 89 are provided at suitable points to be frictionally engageable by an element 88 whereby a projectile 29 in a bight of the element 88 may be moved either way between the hoists and the stowage means or between the fixed stowage racks 28 and 31 and the respective movable stowage ring on the same level therewith. As is well known to those skilled in the art, this is accomplished by passing that part of the element 88 on the side of bight opposite eye 87 over the driven sheave 89 and maintaining taut the fall of the element 88 to the extent necessary to obtain the requisite frictional engagement between element 88 and sheave 89 to move the load in the bight. The element 88 may even be given one or more complete turns around the sheave 89 if necessary or advantageous. Adjacent the hoists the idler pulleys 90 are mounted and around these the elements 88 pass to cause the bight in elements 88 to be directly opposed to the passages into the hoists.

The invention hereindescribed and claimed may be used and manufactured by or for the Government of the United States of America for governmental purposes without the payment of any royalties thereon or therefor.

We claim:

1. A system for stowing and handling large caliber projectiles for guns in rotatable turrets, comprising the combination with a rotatable turret of a plurality of projectile hoists carried by said turret to rotate therewith, each said hoist having access means for loading projectiles thereinto on the radially inner side and also outwardly therefrom at each of two vertically superposed levels, a projectile stowage ring at each said level radially inwardly of said hoists mounted on said turret structure to be carried thereby but to be rotatable relatively thereto, means to drive said rings independently to effect such relative rotation, means on each said ring for individually securing projectiles in two annular series on each ring, a fixed annular stowage rack at each said level outwardly of said turret, means on the lower said stowage rack for individually securing projectiles in two annular series and on the upper said stowage rack for individually securing projectiles in one annular series, a respective ram mechanism on each said level disposed adjacent each said hoist to move projectiles from the respective stowage ring into the respective hoist, and power operated parbuckling means to move projectiles from a said stowage rack to a hoist or to the stowage ring on the same level with the rack.

2. A system for stowing and handling large caliber projectiles for guns in rotatable turrets, comprising the combination with a rotatable turret of a plurality of projectile hoists carried by said turret to rotate therewith, each said hoist having access means for loading projectiles thereinto on the radially inner side and also outwardly therefrom at each of two vertically superposed levels, a projectile stowage ring at each said level radially inwardly of said hoists mounted on said turret structure to be carried thereby but to be rotatable relatively thereto, means to drive said rings independently to effect such relative rotation, means on each said ring for individually securing projectiles in two annular series on each ring, a fixed annular stowage rack at each said level outwardly of said turret, means on the lower said stowage rack for individually securing projectiles in two annular series and on the upper said stowage rack for individually securing projectiles in one annular series, and power operated parbuckling means to move projectiles between a respective stowage ring and a hoist and between a stowage rack and a stowage ring on the same level as such rack.

3. A system for stowing and handling large caliber projectiles for guns in rotatable turrets, comprising the combination with a rotatable turret of a plurality of projectile hoists carried by said turret to rotate therewith, each said hoist having access means for loading projectiles thereinto on the radially inner side and also outwardly therefrom at each of two vertically superposed levels, a projectile stowage ring at each said level radially inwardly of said hoists mounted on said turret structure to be carried thereby but to be rotatable relatively thereto, means to drive said rings independently to effect such relative rotation, means on each said ring for individually securing projectiles in two annular series on each ring, a fixed annular stowage rack at each said level outwardly of said turret, means on the lower said stowage rack for individually securing projectiles in two annular series and on the upper said stowage rack for individually securing projectiles in one annular series, and power means to move projectiles between a stowage ring and a hoist and between a stowage rack and a hoist or a stowage ring on the same level.

4. A system for stowing and handling large caliber projectiles for guns in rotatable turrets, comprising the combination with a rotatable turret of a plurality of projectile hoists carried by said turret to rotate therewith, each said hoist having access means for loading projectiles thereinto on the radially inner side at each of two vertically superposed levels, a projectile stowage ring at each said level radially inwardly of said hoists mounted on said turret structure to be carried thereby but to be rotatable relatively thereto, means to drive said rings independently to effect such relative rotation, means on each said ring for individually securing projectiles on each ring, and a respective ram mechanism on each said level disposed adjacent each hoist to move projectiles from the respective stowage ring into the hoist.

5. A system for stowing and handling large caliber projectiles for guns in rotatable turrets, comprising the combination with a rotatable turret of a plurality of projectile hoists carried by said turret to rotate therewith, each said hoist having access means for loading projectiles thereinto on the radially inner side at each of two vertically superposed levels, a projectile stowage ring at each said level radially inwardly of said hoists mounted on said turret structure to be carried thereby but to be rotatable relatively thereto, means to drive said rings independently to effect such relative rotation, means on each said ring for individually securing projectiles on each ring, and power mechanism to move projectiles between the stowage rings and a hoist.

6. A system for stowing and handling large caliber projectiles for guns in rotatable turrets, comprising the combination with a rotatable turret of a plurality of projectile hoists carried by said turret to rotate therewith, a projectile rack disposed around said turret structure at each of two vertically superposed levels, means to secure projectiles individually on said racks, access means in each said hoist at each said level to admit projectiles from said stowage racks into such hoist, and power means to move projectiles between said racks and said hoists.

7. A system for stowing and handling large caliber projectiles for guns in rotatable turrets, comprising the combination with a rotatable turret of a plurality of projectile hoists carried by said turret to rotate therewith, a projectile rack disposed around said turret structure at each of two vertically superposed levels, means to secure projectiles individually on said racks, access means in each said hoist at each said level to admit projectiles from said stowage racks into such hoist, and power actuated parbuckling means to move projectiles between said racks and said hoists.

8. Projectile handling means, comprising a guiding structure having a passage for projectiles, hoisting mechanism operating in said structure to convey projectiles through said passage, access means to permit loading projectiles into said passage from more than one direction at each of two superposed levels, said means including elongated members parallel to and swingable toward said passage and having buffer elements disposed adjacent a projectile during hoisting to prevent tipping of the projectile, means to limit the outward swing of said elements away from the passage, and power means to move projectiles through any said access means into said passage.

9. Projectile handling means, comprising a guiding structure having a passage for projectiles, hoisting mechanism operating in said structure to convey projectiles through said passage, access means to permit loading projectiles into said passage from more than one direction at each of two superposed levels, said means including elongated members parallel to and swingable toward said passage and having buffer elements disposed adjacent the projectile during hoisting to prevent tipping of the projectile, a resilient backing binding each said element, means to limit the outward swing of said elements away from the passage, and means to move projectiles through any said access means into said passage.

10. An ammunition stowage and handling system, comprising fixed stowage means at each of two superposed levels, independently movable stowage means at each said level laterally spaced from the respective fixed stowage means, hoisting mechanism disposed between said fixed stowage means and said movable stowage means, separate access means in said hoisting mechanism at each said level to admit ammunition directly into said hoisting mechanism from any selected stowage means, and means to move ammunition between said stowage means and said hoisting mechanism and between the fixed and the movable stowage means at each said level.

11. A projectile hoist, comprising a plurality of posts spaced apart about a passageway for projectiles, means disposed between pairs of said posts to move projectiles through said passageway, a plurality of shutters at each of two superposed levels mounted on said posts to be swingable into said passageway to give access to said passageway from more than one direction at each of said levels, self-acting means to return each said shutter to a predetermined position to act as a guide for a projectile being moved through said passageway and to prevent fortuitous movement of a projectile from said hoist, means movable into position in said passageway to receive projectiles when hoisting from the upper of said levels, and movable out of said passageway when hoisting from the lower of said levels, and means to lock each said shutter in the inwardly swung position to permit removal of projectiles from said hoist at each of said levels.

12. A projectile hoist, comprising a plurality of posts spaced apart about a passageway for projectiles, means disposed between pairs of said posts to move projectiles through said passageway, a plurality of shutters at each of two superposed levels mounted on said posts to be swingable into said passageway to give access to said passageway from more than one direction at each of said levels, each said shutter being pivotally mounted at one edge and having a free edge, a buffer strip in the free edge of at least one shutter at each said level and a resilient buffer pad back of said strip, a stop for each said shutter to limit the outward swing of the shutter, and self-acting means to move each shutter against its respective stop to act as a guide for a projectile being moved through the hoist.

GEORGE A. CHADWICK.
PHILIAS H. GIROUARD.

REFERENCES CITED

The following references are of record in the file of this patent:

UNITED STATES PATENTS

| Number | Name | Date |
|---|---|---|
| 380,688 | Murray | Apr. 10, 1888 |
| 1,057,556 | Joor | Apr. 1, 1913 |
| 1,148,077 | Cowly | July 27, 1915 |
| 1,158,161 | Bean | Oct. 26, 1915 |
| 1,182,986 | Dawson et al. | May 16, 1916 |
| 1,565,836 | Webster | Dec. 15, 1925 |
| 1,577,627 | Webster | Mar. 23, 1926 |
| 1,828,307 | Bean | Oct. 20, 1931 |
| 1,871,307 | Davis | Aug. 9, 1932 |
| 1,907,967 | Himes | May 9, 1933 |
| 1,911,015 | Crabbe | May 23, 1933 |
| 1,997,060 | Hirsfeld | Apr. 9, 1935 |
| 2,181,279 | McLauthlin | Nov. 28, 1939 |
| 2,204,023 | Mason | June 11, 1940 |

FOREIGN PATENTS

| Number | Country | Date |
|---|---|---|
| 9,548 | Great Britain | Apr. 17, 1897 |
| 11,461 | Great Britain | 1896 |
| 12,784 | Great Britain | 1901 |
| 28,495 | Great Britain | 1903 |
| 385,967 | Great Britain | Jan. 3, 1933 |